March 11, 1952 — T. WHEATLEY — 2,589,176

VALVE ASSEMBLY

Filed April 11, 1946

Inventor
Thomas Wheatley
By E. V. Hardway,
Attorney

Patented Mar. 11, 1952

2,589,176

UNITED STATES PATENT OFFICE 2,589,176

VALVE ASSEMBLY

Thomas Wheatley, Houston, Tex.

Application April 11, 1946, Serial No. 661,446

2 Claims. (Cl. 251—123)

This invention relates to a valve assembly.

An object of the invention is to provide a valve assembly specially designed for controlling the flow of fluid through lines, such as pipe lines, and which may be quickly and easily reversed, upon reversal of the direction of the flow of fluid through the line so as to control the flow.

With the above and other objects in view the invention has particular relation to certain novel features of construction, operation and arrangements of parts, an example of which is given in this specification and illustrated in the accompanying drawings, wherein—

Figure 1:
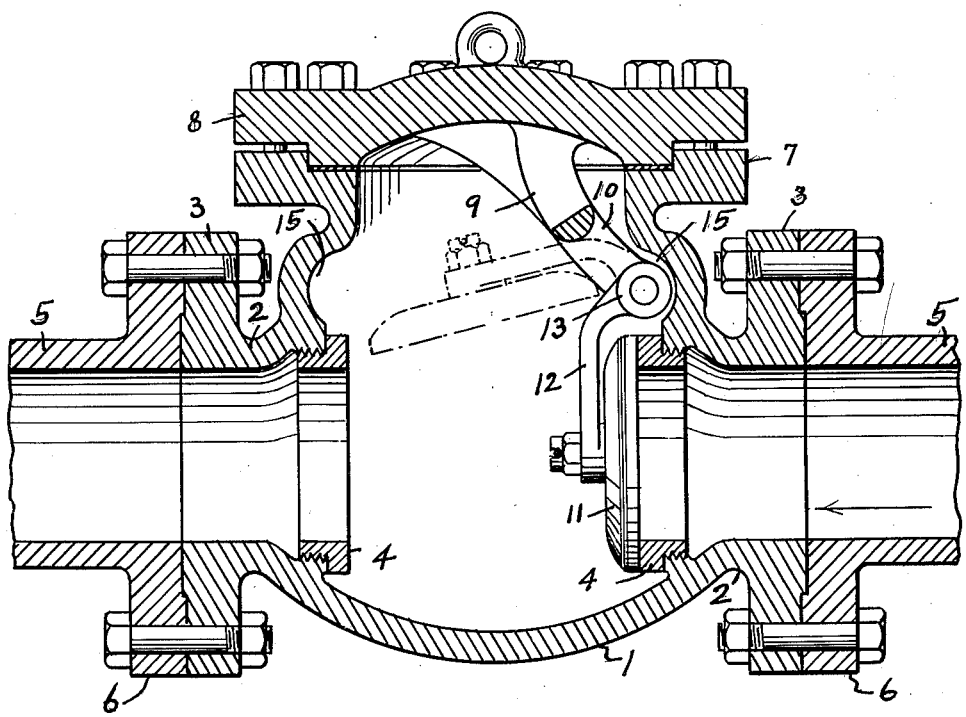
Figure 2:
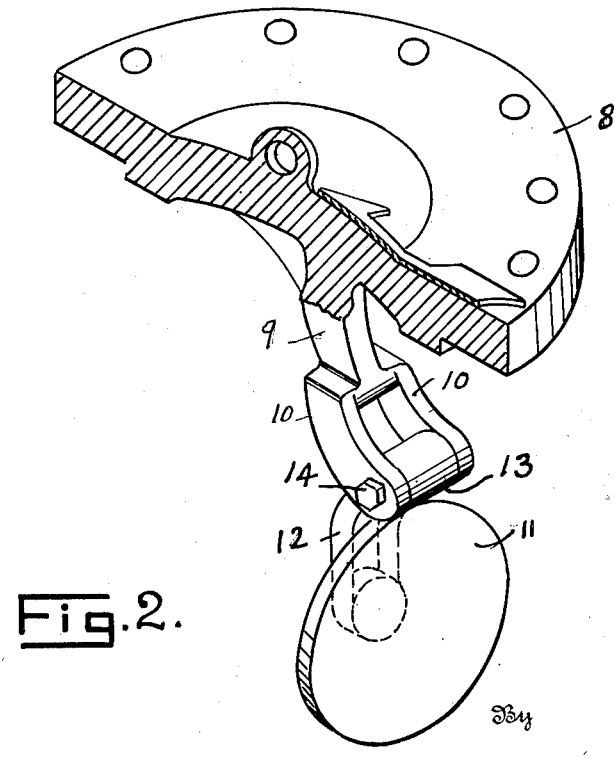

Figure 1 is a longitudinal, sectional view of the valve shown connected into a pipe line; and Figure 2 is a perspective view of the cover plate showing the valve connected thereto.

Referring now more particularly to the drawings wherein like numerals of reference designate the same parts in each of the figures, the numeral 1 designates a valve casing which is preferably of a general globular shape and which has the tubular end connections 2, 2 provided with external annular flanges 3, 3.

These end connections are aligned and screwed into them are the inwardly facing annular valve seats 4, 4.

The adjacent ends of the pipe line sections 5, 5 are provided with annular flanges 6, 6 which may be bolted to the corresponding flanges 3.

The top of the valve casing is open and is provided with an annular flange 7 on which the closure cap 8 is bolted.

Formed integrally with this cap and depending therefrom in a diagonal direction there is an arm 9 whose free end is bifurcated forming the outwardly curved, spaced prongs 10, 10.

The numeral 11 designates a disc like valve which carries the hinge member 12.

This hinge member is connected, at one end, to the inner side of the valve, at the center, and its other end is curved outwardly and formed with a sleeve-like bearing 13 which fits between the prongs 10. A hinge pin 14 extends through said prongs and through the sleeve bearing 13 so that the valve is swung from the prongs.

Above the seats 4, on each side, the valve casing is formed with the inside recesses 15, 15 into one of which the hinge connection between the prongs and the valve projects. This is necessary in order that the valve will align, axially, with the seat with which it co-operates so as to form a close fit therewith.

As illustrated in Figure 1 the fluid flowing through the line flows in the direction indicated by the arrow and the valve will readily open to the position shown in dotted lines in Figure 1 and the valve casing is upwardly extended to provide clearance for the valve to allow it to fully open.

Should it be desired for any reason to reverse the flow of fluid through the line all that will be necessary will be to reverse the position of the cap 8 and this will reverse the valve into position to co-operate with the other seat 4.

The drawings and description are illustrative merely while the broad principle of the invention will be defined by the appended claims.

What I claim is:

1. A valve assembly comprising, a valve casing having tubular end connections and an opening in the top thereof, annular valve seats at the inner ends of the connections and spaced apart, said casing having identically shaped inside recesses symmetrically arranged along the axis of flow through said assembly about a central plane perpendicular to said axis and equidistant from the respective seats, a cap detachably mounted on said casing and closing said opening, said cap and casing having registering openings symmetrically arranged about said plane and equidistant from the valve seats and fastening means cooperable with the cap and casing in said registering openings for securing the cap on the casing, an arm immovably fixed on said cap and depending from the cap into the casing, a hinge member, pivotal means connecting the hinge member to the free end of the arm, a valve carried by the hinge member and adapted to be aligned axially with either of said seats, said pivotal means being formed to fit snugly into either of said recesses when the valve is in open or closed position.

2. A valve assembly comprising, a valve casing having an open top and aligned tubular end connections, inwardly facing annular valve seats at the inner ends of the connections and spaced apart, an annular flange surrounding said opening, a detachable cap mounted on said flange, said cap and flange having registering openings symmetrically arranged about a central plane perpendicular to the axis of flow through the assembly and equidistant from the valve seats, and fastening means cooperable with the cap and flange in said registering openings for securing the cap on the flange, an arm immovably fixed on said cap and extending downwardly into said casing, said arm having its free end bifurcated to form outwardly curved, spaced prongs, a valve in said casing adapted to be aligned axially with either of said seats, hinge means pivotally connecting said valve to said prongs, said casing having identically shaped inside recesses symmetrically arranged along said axis of flow about said central plane and equidistant from the adjacent valve seat into which said hinge means snugly projects when said valve is in open or closed position.

THOMAS WHEATLEY.

REFERENCES CITED

The following references are of record in the file of this patent:

UNITED STATES PATENTS

| Number | Name | Date |
| --- | --- | --- |
| 305,722 | Tomlinson | Sept. 23, 1884 |
| 483,603 | Craine | Oct. 4, 1892 |
| 556,636 | Kuichling | Mar. 17, 1896 |
| 793,577 | Frank | June 27, 1905 |
| 1,581,595 | Osborne | Apr. 20, 1926 |
| 1,821,992 | Stevens | Sept. 8, 1931 |
| 1,935,197 | Williams | Nov. 14, 1933 |
| 2,029,633 | Muhleisen | Feb. 4, 1936 |